(12) United States Patent
Mizutani et al.

(10) Patent No.: US 9,891,316 B2
(45) Date of Patent: Feb. 13, 2018

(54) APPARATUS AND METHOD FOR DETECTING TARGET IN PERIPHERY OF VEHICLE

(71) Applicant: DENSO CORPORATION, Kariya, Aichi-pref. (JP)

(72) Inventors: Akiyoshi Mizutani, Nagoya (JP); Yoshie Samukawa, Kariya (JP); Ryusuke Uyama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 254 days.

(21) Appl. No.: 14/765,821

(22) PCT Filed: Feb. 4, 2014

(86) PCT No.: PCT/JP2014/052546
§ 371 (c)(1),
(2) Date: Aug. 4, 2015

(87) PCT Pub. No.: WO2014/123112
PCT Pub. Date: Aug. 14, 2014

(65) Prior Publication Data
US 2015/0362592 A1 Dec. 17, 2015

(30) Foreign Application Priority Data

Feb. 5, 2013 (JP) .................................. 2013-020498
Jan. 31, 2014 (JP) .................................. 2014-016999

(51) Int. Cl.
*G01S 13/93* (2006.01)
*G01S 7/41* (2006.01)
(Continued)

(52) U.S. Cl.
CPC ............ *G01S 13/931* (2013.01); *G01S 7/354* (2013.01); *G01S 7/411* (2013.01); *G01S 13/04* (2013.01);
(Continued)

(58) Field of Classification Search
CPC ........ G01S 13/931; G01S 13/04; G01S 13/08; G01S 7/411; G01S 13/46; G01S 7/354;
(Continued)

(56) References Cited

U.S. PATENT DOCUMENTS 5,633,705 A * 5/1997 Asayama ................ G01S 7/497
180/167
6,266,005 B1 * 7/2001 Schneider ............... G01S 13/42
342/118
(Continued)

FOREIGN PATENT DOCUMENTS

JP 2003-270348 A 9/2003
JP 2003-320912 A 11/2003
(Continued)

OTHER PUBLICATIONS

C. Lauer, T. Herpel, R. German and J. Pollmer, "Bounding the number of relevant objects in automotive environment perception systems," 2009 Sixth International Conference on Networked Sensing Systems (INSS), Pittsburgh, PA, 2009, pp. 1-8.*
(Continued)

*Primary Examiner* — John B Sotomayor
(74) *Attorney, Agent, or Firm* — Knobbe, Martens, Olson & Bear, LLP

(57) ABSTRACT

An on-vehicle target detection apparatus is provided. The apparatus includes a radar sensing portion and a processing unit that processes information from the radar sensing portion. The processing unit detects a target that is present in the periphery of the vehicle based on detection results
(Continued)

from the radar sensing portion, and determines a depth determination value indicating the depth of the target detected. The processing unit compares the depth determination threshold and a threshold set in advance and determines that the target is a low-lying target that is surmountable by the vehicle, when the depth determination value is determined to be less than the threshold.

17 Claims, 11 Drawing Sheets

(51) Int. Cl.
*G01S 13/46* (2006.01)
*G01S 13/04* (2006.01)
*G01S 13/08* (2006.01)
G01S 7/35 (2006.01)
G01S 13/34 (2006.01)
G01S 13/86 (2006.01)

(52) U.S. Cl.
CPC .............. *G01S 13/08* (2013.01); *G01S 13/46* (2013.01); *G01S 13/345* (2013.01); *G01S 13/86* (2013.01); *G01S 2007/356* (2013.01); *G01S 2013/462* (2013.01); *G01S 2013/9346* (2013.01); *G01S 2013/9353* (2013.01); *G01S 2013/9375* (2013.01)

(58) Field of Classification Search
CPC .. G01S 13/345; G01S 2007/356; G01S 13/86; G01S 2013/9346; G01S 2013/9353; G01S 2013/462; G01S 2013/9375
See application file for complete search history.

(56) References Cited

U.S. PATENT DOCUMENTS

| | | | | |
|---|---|---|---|---|
| 6,437,854 | B2* | 8/2002 | Hahlweg | G01S 17/325 356/342 |
| 6,703,966 | B2* | 3/2004 | Corbrion | G01S 13/60 342/104 |
| 7,741,961 | B1* | 6/2010 | Rafii | B60Q 9/005 340/435 |
| 9,024,740 | B2* | 5/2015 | Min | B60Q 1/085 340/425.5 |
| 2003/0174054 | A1 | 9/2003 | Shimomura | |
| 2005/0225744 | A1 | 10/2005 | Samukawa et al. | |
| 2005/0270225 | A1* | 12/2005 | Tokoro | G01S 7/4004 342/70 |
| 2009/0135047 | A1 | 5/2009 | Matsuura et al. | |
| 2009/0262760 | A1* | 10/2009 | Krupkin | G01S 7/414 372/6 |
| 2009/0303024 | A1* | 12/2009 | Asari | B60Q 1/484 340/425.5 |
| 2011/0006941 | A1 | 1/2011 | Samukawa et al. | |
| 2011/0121994 | A1* | 5/2011 | Pampus | B62D 15/027 340/932.2 |
| 2011/0133914 | A1* | 6/2011 | Griffin | G01S 17/48 340/435 |
| 2011/0248880 | A1 | 10/2011 | Miyahara et al. | |
| 2012/0271483 | A1 | 10/2012 | Samukawa et al. | |
| 2012/0299766 | A1 | 11/2012 | Mizutani et al. | |
| 2013/0207834 | A1 | 8/2013 | Mizutani et al. | |
| 2015/0015434 | A1* | 1/2015 | Okita | G01S 13/931 342/27 |
| 2015/0032363 | A1* | 1/2015 | Itoh | G01S 13/931 701/301 |
| 2016/0378111 | A1* | 12/2016 | Lenser | G05D 1/0274 701/2 |
| 2017/0060810 | A1* | 3/2017 | Preston | G06F 17/50 |

FOREIGN PATENT DOCUMENTS

| | | |
|---|---|---|
| JP | 2004-020492 A | 1/2004 |
| JP | 2005-300307 A | 10/2005 |
| JP | 2009-115628 A | 5/2009 |
| JP | 2010-101849 A | 5/2010 |
| JP | 2011-017634 A | 1/2011 |
| JP | 2011-232325 A | 11/2011 |
| JP | 2012-242247 A | 12/2012 |
| JP | 2013-164390 A | 8/2013 |
| WO | 2014/123112 A1 | 8/2014 |

OTHER PUBLICATIONS

International Preliminary Report on Patentability; International Application No. PCT/JP2014/052546; Filed: Feb. 4, 2014 (with English translation).
International Search Report (translated version); International Application No. PCT/JP2014/052546, filed Feb. 4, 2014; 5 pages.

* cited by examiner

FIG.4
(a) FFT
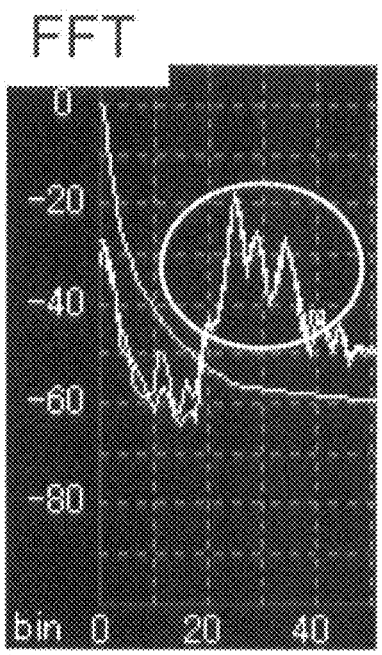
(b)
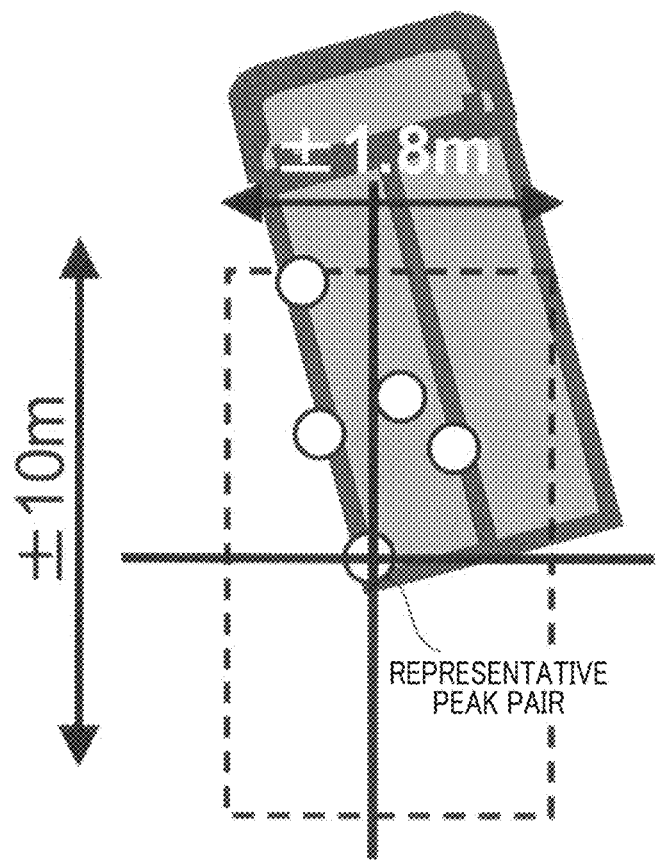

APPARATUS AND METHOD FOR DETECTING TARGET IN PERIPHERY OF VEHICLE

CROSS-REFERENCE TO RELATED APPLICATION

This application is based on and claims the benefit of priority from earlier Japanese Patent Application No. 2013-020498 filed on Feb. 5, 2013, and No. 2014-016999 filed on Jan. 31, 2014, the descriptions of which are incorporated herein by reference.

BACKGROUND

Technical Field

The present invention relates to an apparatus and a method for detecting a target that is present in the periphery of a vehicle. In particular, the apparatus and the method are that in which information indicating the presence of a target that includes information on the height of the target is generated.

Background Art

Many on-board radar apparatuses that transmit and receive radar waves to detect information (such as the distance to a target, relative speed, and orientation) related to a target that has reflected the radar waves have been known since the past. For example, PTL 1 is proposed as this type of on-board radar apparatus. In this apparatus, the height of the target from the road surface is estimated from the power distribution (null point generation pattern) of reception power regarding a target that has been continuously detected over a plurality of measurement cycles. A null point refers to a point at which the reception power of a reflected wave is at a local minimum.

CITATION LIST

Patent Literature

[PTL 1] JP-A-2011-17634

Technical Problem

In target detection disclosed in the above-described publication, the null point generation pattern ordinarily indicates a wider generation interval between null points as the height from the road surface decreases. In the case of a road surface object (also referred to, hereafter, as a "low-lying target") composed of metal that is embedded in the road surface, such as a manhole cover, null points are not generated.

However, as shown in FIG. 8(a) and FIG. 8(b), when a vehicle that is traveling downhill detects a low-lying target on a level road surface ahead of the vehicle (FIG. 8(a)), or when a vehicle that is traveling on a level road surface detects a low-lying object that is provided on an uphill ahead of the vehicle (FIG. 8(b)), the power distribution of reception power becomes equivalent to that of a non-low-lying target that is at a height from the road surface. As a result, a problem occurs in that whether the detected target is a low-lying target that can be surmounted or a non-low-lying target with a collision may occur cannot be identified.

SUMMARY

In order to solve the above-described problem, an object of the present invention it is thus desired is to provide an apparatus and a method for identifying a low-lying target by a simple technique regardless of road shape.

Solution to Problem

A target detection apparatus according to an aspect of the present disclosure includes target detecting means, determination value calculating means, and low-lying target determining means. The target detecting means detects a target that is present in the periphery of a vehicle based on detection results from a radar sensor that transmits and receives radar waves and detects the position and speed of reflection points that have reflected the radar waves, for each measurement cycle set in advance. The determination value calculating means determines a depth determination value that indicates the depth of the target detected by the target detecting means. The low-lying target determining means determines that the target is a low-lying target that is surmountable by the vehicle, when the depth determination value is determined to be less than the threshold by the determination value calculating means.

In other words, the size in the depth direction, when viewed from the vehicle, of most low-lying targets detected on a typical road, such as manhole covers, does not reach 1 m, even at the largest. Meanwhile, other obstacles detected on the road, particularly vehicles, reflect radar waves not only from the rear end surface of the vehicle, but also, for example, from objects inside the vehicle through window glass, and from the underside of the vehicle body by radar waves passing under the vehicle body. Therefore, the positions of reflection points based on the reflected waves from the same object vary based on the size of the object. The variation increases as the depth dimension increases. In addition, the number of reflection points also increases. Therefore, detection as an object that has depth can be made (see FIG. 4(a)).

In other words, whether or not a detected target is a low-lying target can be determined. Regardless of road shape, by a simple technique in which the depth of the target is determined, taking advantage of the above-described characteristic.

In addition, according to another aspect of the present disclosure, a target detection method is provided that is mounted in a vehicle, and by which information related to a target present in the periphery of the vehicle is generated. The detection method includes: detecting a target that is present in the periphery of the vehicle based on detection results from a radar sensor that transmits and receives radar waves and detects the position and speed of reflection points that have reflected the radar waves, for each measurement cycle set in advance; determining a depth determination value that indicates the depth of the detected target; comparing the calculated depth determination threshold and a threshold set in advance; and determining that the target is a low-lying target that is surmountable by the vehicle, when the depth determination value is determined to be less than the threshold by the comparison. Working effects similar to those described above can also be achieved by this detection method.

In addition, the above configurations can be actualized by various aspects other than the above-described target detection apparatus, such as a system of which the target detection apparatus is a constituent element, a program for enabling a computer to function as each means configuring the target detection apparatus, and a target detection method.

BRIEF DESCRIPTION OF DRAWINGS

In the accompanying drawings:

FIG. 4(a) is a graph that indicates the shapes of peaks based on reflected waves from a target having depth, and FIG. 4(b) shows an example of the reflection points on a target having depth and is an explanatory diagram of the conditions used when determining a representative pair and a depth determination value;

DESCRIPTION OF EMBODIMENTS

Various embodiments of the present invention will hereinafter be described with reference to the drawings.

First Embodiment

[Overall Configuration]

Figure 1:
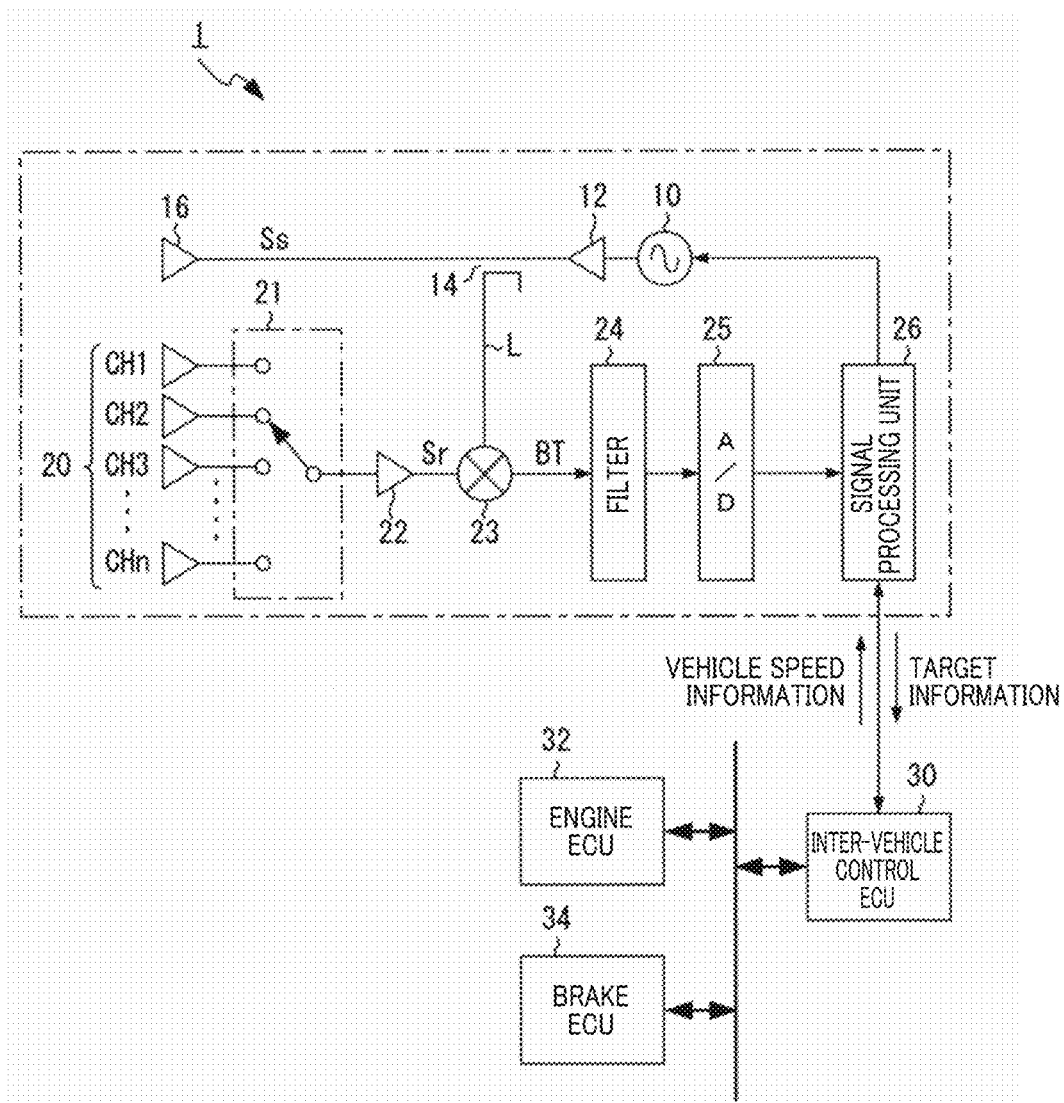
FIG. 1 is a block diagram of a configuration of a vehicle control system.

A vehicle control system to which the present invention is applied is mounted in a vehicle. As shown in FIG. 1, the vehicle control system includes an inter-vehicle control electronic control unit (referred to, hereafter, as an "inter-vehicle control ECU") 30, an engine electronic control unit (referred to, hereafter, as an "engine ECU") 32, and a brake electronic control unit (referred to, hereafter, as a "brake ECU") 34. The ECUs 30, 32, and 34 are connected to one another by a local area network (LAN) communication bus. In addition, each ECU 30, 32, and 34 is configured mainly by a known microcomputer, and includes at least a bus controller to perform communication via the LAN communication bus.

Furthermore, the inter-vehicle control ECU 30 is connected to an alert buzzer, a cruise control switch, a target inter-vehicle setting switch, and the like (not shown), and is also connected to a radar sensor 1.

Here, the radar sensor 1 is configured as a so-called "millimeter wave radar" that uses frequency modulated continuous wave (FMCW) technology. The radar sensor 1 transmits and receives millimeter waveband radar waves that have been frequency modulated, thereby recognizing targets such as a leading vehicle and roadside objects. The radar sensor 1 generates target information that is information related to the target that have been recognized (referred to, hereafter, as a "recognized target"), and transmits the target information to the inter-vehicle control ECU 30.

The target information includes the distance to the recognized target, relative speed, the orientation at which the recognized target is positioned, the degree of likelihood of a collision, an estimated size value (height or width) of a recognized target with which the likelihood of a collision is high, and the like.

[Configuration of the Brake ECU]

The brake ECU 34 transmits a brake pedal state determined based on information from a master cylinder (M/C) pressure sensor (not shown), in addition to detection information (steering angle and yaw rate) from a steering sensor and a yaw rate sensor (not shown), to the inter-vehicle control ECU 30. In addition, the brake ECU 34 receives target acceleration, brake request, and the like from the inter-vehicle control ECU 30, and controls braking force by driving a brake actuator that opens and closes a pressure increase control valve and a pressure decrease control valve provided in a brake hydraulic circuit, based on the received information and determined braking state.

[Configuration of the Engine ECU]

The engine ECU 32 transmits detection information (vehicle speed, engine control state, and accelerator operation state) from a vehicle speed sensor, a throttle opening sensor, and an accelerator pedal opening sensor (not shown) to the inter-vehicle control ECU 30. In addition, the engine ECU 32 receives target acceleration, fuel cut request, and the like from the inter-vehicle control ECU 30, and outputs drive commands to a throttle actuator that adjusts the throttle opening of an internal combustion engine, and the like based on the driving state identified from the received information.

[Configuration of the Inter-Vehicle Control ECU]

The inter-vehicle control ECU 30 receives the vehicle speed and engine control state from the engine ECU 32, the steering angle, yaw rate, and brake control state from the brake ECU 34, and the like. In addition, the inter-vehicle control ECU 30 transmits the target acceleration, fuel cut request, and the like to the engine ECU 32, and the target acceleration, brake request, and the like to the brake ECU 34, as control commands to adjust the inter-vehicle distance to a leading vehicle to an appropriate distance, based on the setting values of the cruise control switch, the target inter-vehicle setting switch, and the like, and target information received from the radar sensor 1. Furthermore, the inter-vehicle control ECU 30 performs determination regarding alert generation and sounds the alert buzzer when an alert is required.

[Configuration of the Radar Sensor]

Here, details of the radar sensor 1 will be described.

The radar sensor 1, corresponding to an on-vehicle target detection apparatus, includes an oscillator 10, an amplifier 12, a distributor 14, a transmission antenna 16, and a reception antenna unit 20. The oscillator 10 generates millimeter waveband high-frequency signals that are modulated to have a rising period during which the frequency linearly increases in relation to time, and a falling period during which the frequency linearly decreases. The amplifier 12 amplifies the high-frequency signals generated by the oscillator 10. The distributor 14 performs power distribution of the output from the amplifier 12 to transmission signals Ss and local signals L. The transmission antenna 16 emits radar waves based on the transmission signals Ss. The reception antenna unit 20 is composed of an n-number of reception antennas that receive the radar waves.

In addition, the radar sensor 1 includes a reception switch 21, an amplifier 22, a mixer 23, a filter 24, an analog-to-digital (A/D) converter 25, and a signal processing unit 26. The reception switch 21 successively selects any of the antennas configuring the reception antenna unit 20, and supplies the reception signal Sr from the selected antenna to the subsequent stage. The amplifier 22 amplifies the reception signal Sr supplied from the reception switch 21. The mixer 23 combines the reception signal Sr amplified by the amplifier 22 and the local signal L, and generates a beat signal BT. The filter 24 removes unnecessary signal components from the beat signal BT generated by the mixer 23. The A/D converter 25 samples the output from the filter 24 and converts the filtered beat signal BT to digital data. The signal processing unit 26 controls the start and stop of the oscillator 10, and the sampling of the beat signals BT via the A/D converter 25. In addition, the signal processing unit 26 performs, for example, signal processing using the sampling data, communicates with the inter-vehicle control ECU 30, and performs a process in which information (vehicle speed information) necessary for signal processing and information (such as target information) obtained as a result of the signal processing are transmitted and received.

In the radar sensor 1, the foregoing members 10, 12, 14, 16, 20-25 compose a radar sensing portion.

Of the foregoing components, each antenna configuring the reception antenna unit 20 is set such that the beam width includes the overall beam width of the transmission antenna 16. The antennas are respectively assigned to CH1 to CHn.

In addition, the signal processing unit 26 is mainly configured by a known microcomputer (such as a central processing unit (CPU) and a memory), and further includes a calculation processing unit (such as a digital signal processor (DSP)) for performing a fast Fourier transform (FFT) process and the like on data loaded via the A/D converter 25.

[Operations of the Radar Sensor]

In the radar sensor 1 according to the present embodiment, configured as described above, when the oscillator 10 starts based on a command from the signal processing unit 26, high-frequency signals generated by the oscillator 10 and amplified by the amplifier 12 are power-distributed by the distributor 14. As a result, the transmission signals Ss and the local signals L are generated. Of the signals, the transmission signals Ss are transmitted via the transmission antenna 16 as the radar waves.

Then, reflected waves that have been reflected and returned by an object after being sent out from the transmission antenna 16 are received by all of the reception antennas configuring the reception antenna unit 20. Only the reception signal Sr from a reception channel CHi (i=1 to n) selected by the reception switch 21 is supplied to the mixer 23 after being amplified by the amplifier 22. The mixer 23 then combines the reception signal Sr and the local signal L from the distributor 14, thereby generating the beat signal BT. After unnecessary signal components are removed by the filter 24, the beat signal BT is sampled by the A/D converter 25 and loaded into the signal processing unit 26.

The reception switch 21 performs switching such that all of channels CH1 to CHn are each selected a predetermined number of times (such as 512 times) during a single modulation cycle of the radar waves. In addition, the A/D converter 25 performs sampling synchronously with the switching timing. In other words, during a single modulation cycle of the radar waves, sampling data is collected for each channel CH1 to CHn and for each rising period and falling period.

[Signal Processing Unit]

Next, a process performed by the signal processing unit 26 will be described.

A read-only memory (ROM) that configures the signal processing unit 26 stores therein at least a null point generation pattern map that is required to perform the process, described hereafter, in addition to a program for this process.

<Main Process>

Figure 2:
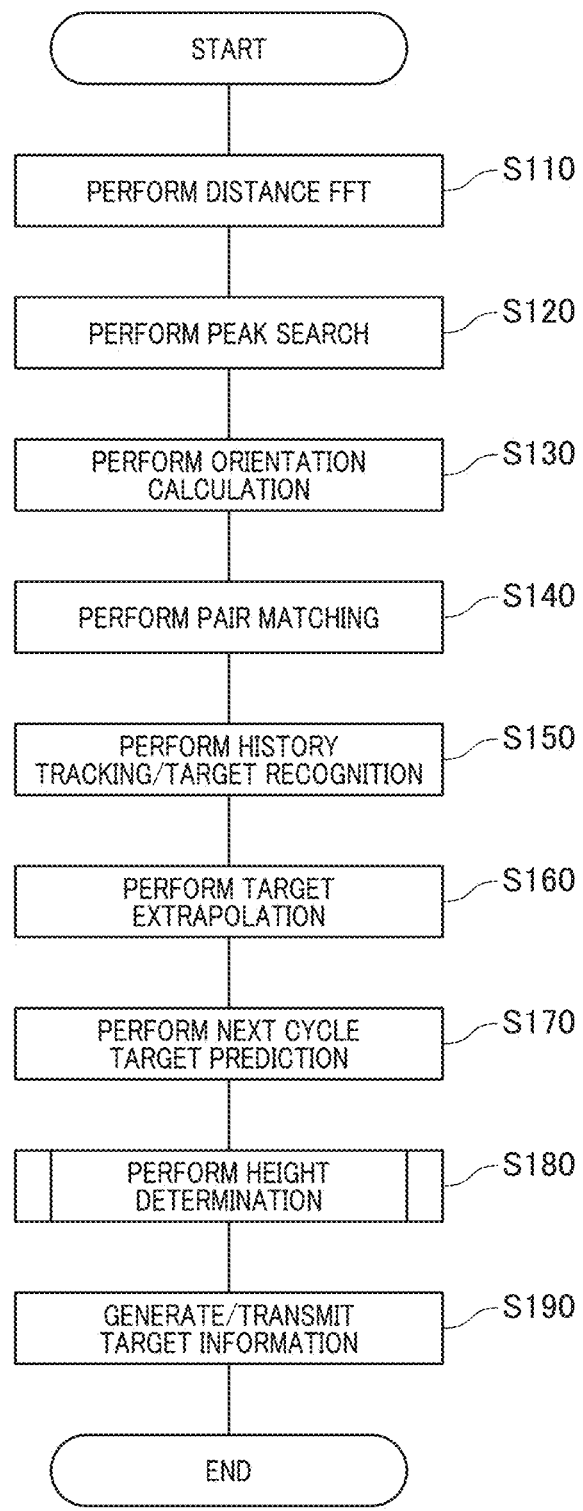
FIG. 2 is a flowchart of the details of a main process performed by a signal processing unit.

Here, a main process performed by the signal processing unit 26 will be described with reference to the flowchart in FIG. 2. In this flowchart and various other flowcharts described hereafter, reference number S indicates step.

The present process is repeatedly started with the single modulation cycle of the radar waves as a measurement cycle.

When the present process is started, at S110, the signal processing unit 26 performs a frequency analysis process (the FFT process, herein) on the sampling data amounting to a single modulation cycle collected during the previous measurement cycle, and calculates the power spectrum of the beat signal BT for each channel CH1 to CHn and for each rising period and falling period.

At S120, the signal processing unit 26 performs a peak search to extract frequency components that forms peaks in the power spectrum determined at S110 (referred to, hereafter, as "peak frequency components"). The peak frequency components extracted through the peak search include those compatible with a predicted value at S180, described hereafter, and those that are not. Furthermore, when a peak frequency component compatible with the predicted value is not present, the signal processing unit 26 assumes that the peak frequency component is embedded in noise or another peak frequency component, and performs extrapolation of the peak frequency component.

Being compatible refers to matching within an allowable range set in advance. In addition, the signal level of the extrapolated peak frequency component is set to zero or noise level At S130, the signal processing unit 26 performs an orientation calculation process to determine the incoming direction of the reflected wave that has generated the peak frequency, for each peak frequency component (excluding extrapolated frequency components) extracted at S120 and for each modulation period. Specifically, the signal processing unit 26 performs a frequency analysis process (a super-resolution process, such as multiple signal classification (MUSIC), or the FFT process, herein) on the n-number of peak frequency components of the same frequency, collected from the channels CH1 to CH n.

At S140, the signal processing unit 26 performs a pair matching process to set a combination of the peak frequency component during up modulation and the peak frequency component during down modulation extracted at step S120. Specifically, the signal processing unit 26 combines peak frequency components extracted at S120 that have substantially matching signal levels and incoming directions calculated at step S130 (the differences in both are equal to or less than match determination thresholds set in advance). Furthermore, regarding each combination that has been set, the signal processing unit 26 calculates the distance and relative speed using a technique known in FMCW radars, and registers only combinations of which the calculated distance and calculated speed are less than an upper limit distance and an upper limit speed set in advance, as official pairs (in other words, radar wave reflection points).

At S150, for each pair registered at S140 of the current measurement cycle (referred to, hereafter, as a "current cycle pair"), the signal processing unit 26 performs a history tracking process in which whether or not the current cycle pair indicates the same target as (is historically connected to) a pair registered at step S140 of the previous measurement cycle (referred to, hereafter, as a "previous cycle pair") is determined.

Specifically, the signal processing unit 26 calculates a predicted position and a predicted speed of a current cycle pair corresponding to the previous cycle pair, based on information on the previous cycle pair. When the differences (position difference and speed difference) between the predicted position and the predicted speed, and the detected position and the detected speed determined from the current cycle pair are respectively less than upper limit values (upper limit position difference and upper limit speed difference) set in advance, the signal processing unit 26 determines that a historical connection is present. The signal processing unit 26 recognizes, as a target, a pair determined to have historical connection over a plurality of measurement cycles (such as five cycles). The current cycle pair successively inherits the information (such as a historical connection count, and an extrapolation counter and extrapolation flag, described hereafter) of the previous cycle pair to which historical connection is present.

At S160, the signal processing unit 26 sets the targets recognized at S150 in the current cycle as current cycle targets and the targets recognized at S150 in the previous cycle as previous cycle targets. When a previous cycle target that is not historically connected to a current cycle target is present, the signal processing unit 26 performs a target extrapolation process in which an extrapolation pair is generated based on the predicted values regarding the previous cycle target, and the extrapolation pair is added to the current cycle targets.

For each current cycle target, an extrapolation flag indicating whether or not extrapolation is performed, and an extrapolation counter that indicates the number of continuous extrapolations are set. When the current cycle target is an actual pair that has actually been detected, the extrapolation flag GF and the extrapolation counter are cleared to zero. When the current cycle target is an extrapolation pair, the extrapolation flag GF is set to 1, and the extrapolation counter is incremented. When the count value of the extrapolation counter reaches a nullification threshold set in advance, the target is nulled as lost.

At S170, for each of the current cycle targets registered at S150 and S160, the signal processing unit 26 performs a next cycle target prediction process to determine the peak frequency to be detected and the orientation angle to be detected at the next cycle.

At S180, the signal processing unit 26 performs a height determination process to determine the height of a stationary target, based on the information obtained at S110 to S170, described above, and the vehicle speed information obtained from the inter-vehicle control ECU 30. At subsequent S190, the signal processing unit generates the target information composed the speed, position, orientation angle, and height estimated at S180 of the target, for each recognized target, and transmits the target information to the inter-vehicle control ECU 30. The signal processing unit 26 then ends the present process.

[Height Determination]

Figure 3:
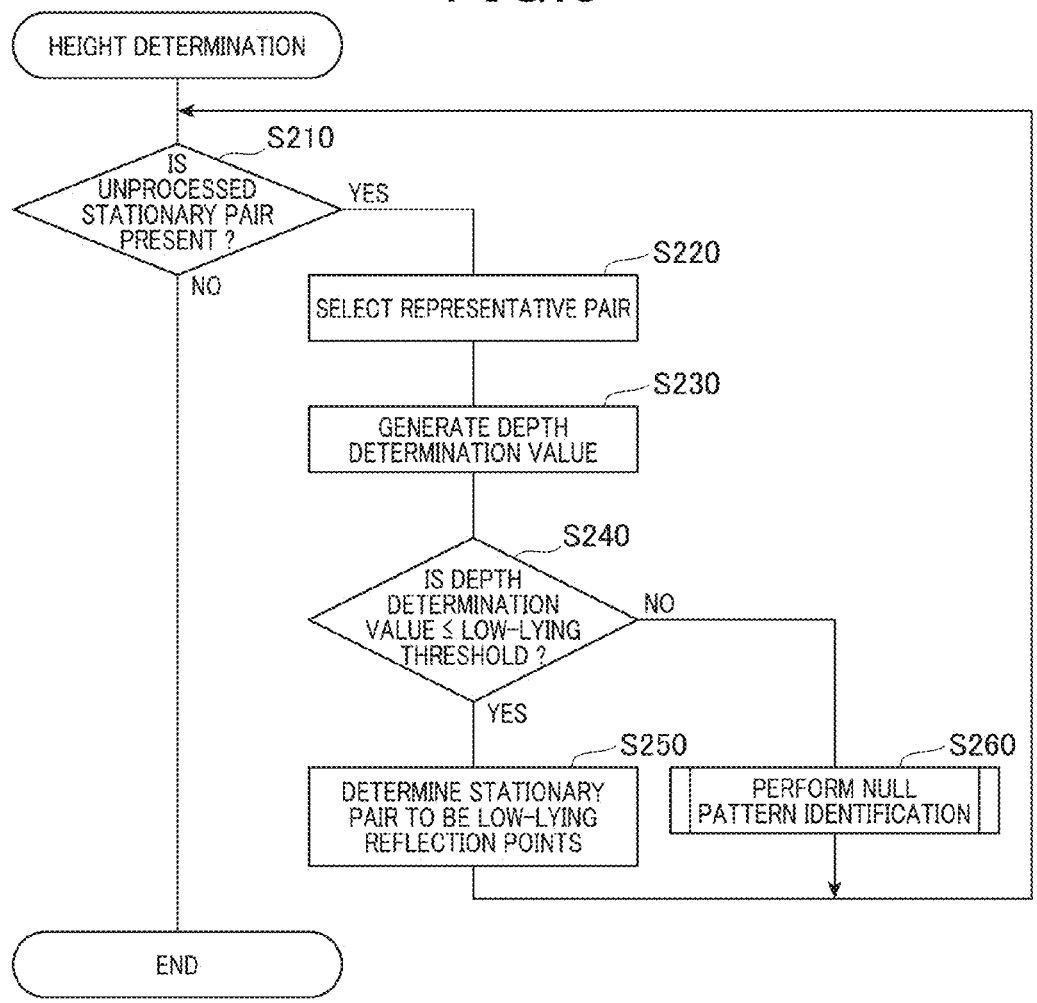
FIG. 3 is a flowchart of the details of a height determination process.

Next, details of the height determination process performed at S180 will be described with reference to the flowchart in FIG. 3.

In the present process, first, at S210, with a pair that is determined to have historical connection over a plurality of cycles and is stationary (such as that of which the relative speed is within ±5 km/h of the own vehicle speed) as a stationary pair, the signal processing unit 26 determines whether or not an unprocessed stationary pair that has not undergone the processes at S220 to S260, described hereafter, is present. When determined that no unprocessed stationary pairs are present, the signal processing unit 26 immediately ends the present process.

When determined that an unprocessed stationary pair is present, at S220, the signal processing unit 26 selects a stationary pair that meets a representative condition, from among the unprocessed stationary pairs, as a representative pair. Here, a stationary pair present in the position closest to the own vehicle is used as the representative condition.

At subsequent S230, the signal processing unit 26 generates a depth determination value of the representative pair. Specifically, the signal processing unit 26 sets the number of stationary pairs (same-object pairs) that are present within a recognized-as-same area and meet a same-target condition as the depth determination value. The recognized-as-same area is set in advance for the selection of stationary pairs that are attributed to the same object as the representative pair. An area in which the difference in vertical position with the representative pair is within a vertical position selection determination value (such as ±10 m) set in advance and the difference in lateral position with the representative pair is within a lateral positon selection determination value (such as ±1.8 m) set in advance is used as the recognized-as-same area (see FIG. 4(b)). In addition, the difference in relative speed with the representative pair being within a same determination value (such as ±5 km/h) is used as the same-target condition At subsequent S240, the signal processing unit 26 determines whether or not the depth determination value is equal to or less than a low-lying threshold (such as 2) set in advance. When determined that the depth determination value is the low-lying threshold or less, at S250, the signal processing unit 26 determines that the stationary pair is based on a low-lying target that is surmountable by the own vehicle (turns ON a low-lying flag) and returns to S210.

Meanwhile, when determined that the depth determination value is greater than the low-lying threshold, at S260, the signal processing unit 26 performs a null pattern identification process to estimate the height of the target using the null point generation pattern map prepared in advance, and then returns to S210. In the null point generation pattern map, the distance from the own vehicle to the target (such as 0 m to 100 m) is divided into a plurality of regions. When even a single null point is present within the region, "1" is set as a map value. When not even a single null point is present in the region, "0" is set as the map value. The null point is the point at which the reception power of the reflected wave affected by multipath is at a local minimum. Here, the height from the road surface (such as 0 cm to 350 cm) is divided into predetermined areas (such as 10 cm). A pattern is stored for each divided area. Details of the null point generation pattern map and the process for estimating the height of a target using the null point generation pattern map are publically known technologies disclosed in prior art documents. Therefore, descriptions thereof are omitted herein.

In other words, the signal processing unit 26 determines whether or not the stationary pair is based on a low-lying target using the depth determination value. The signal processing unit 26 then estimates the height of the target by the null pattern identification process for a non-low-lying target.

[Workings]

Figure 5:
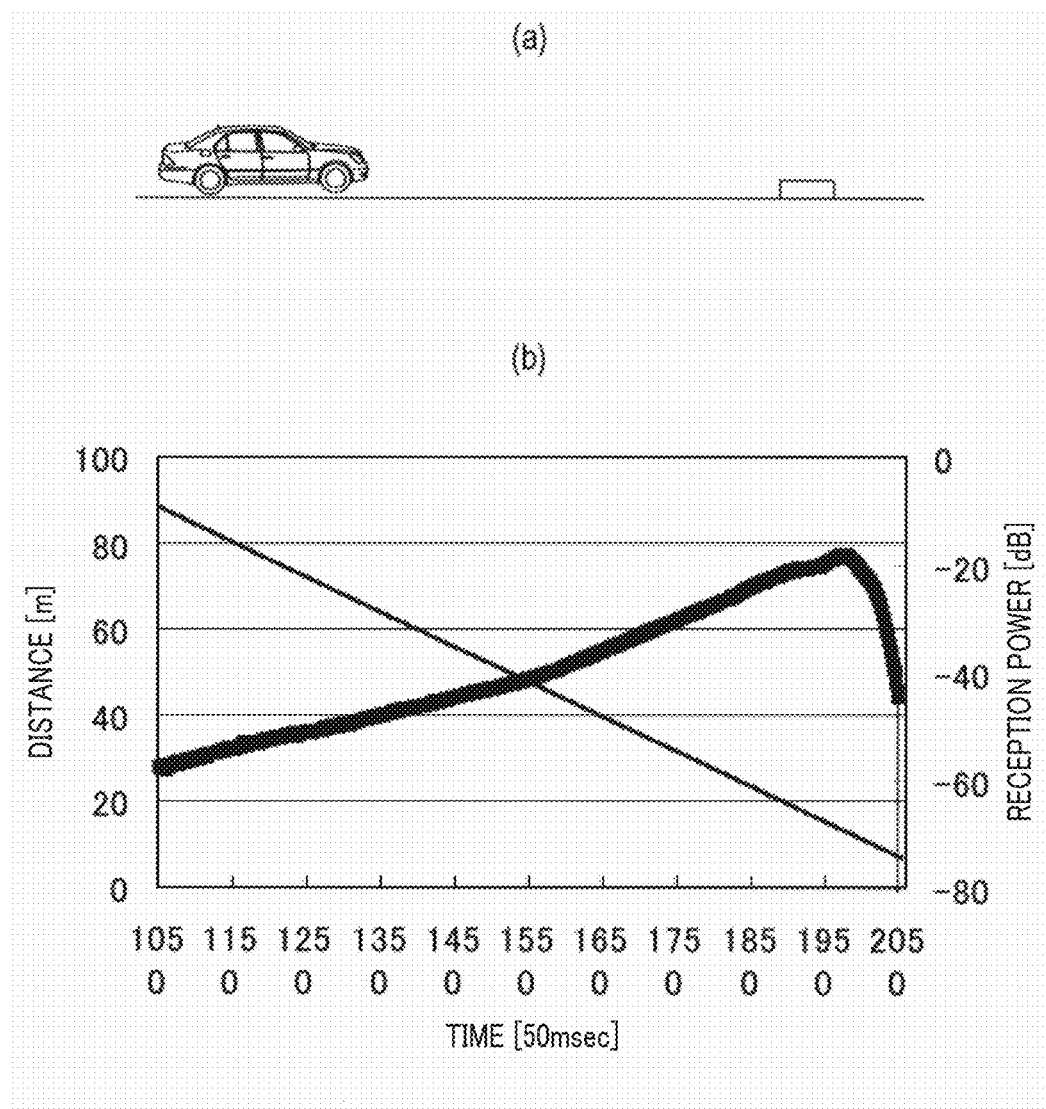
FIG. 5(a) is an explanatory diagram of a road shape and a positional relationship between an own vehicle and a low-lying target (when the vehicle and the low-lying target are present on a flat road)
FIG. 5(b) is a graph that indicates, in time series, the distance to the low-lying target and the reception strength of reflected waves from the low-lying target detected when the vehicle is approaching the low-lying target in the state in FIG. 5(a)
Figure 7:
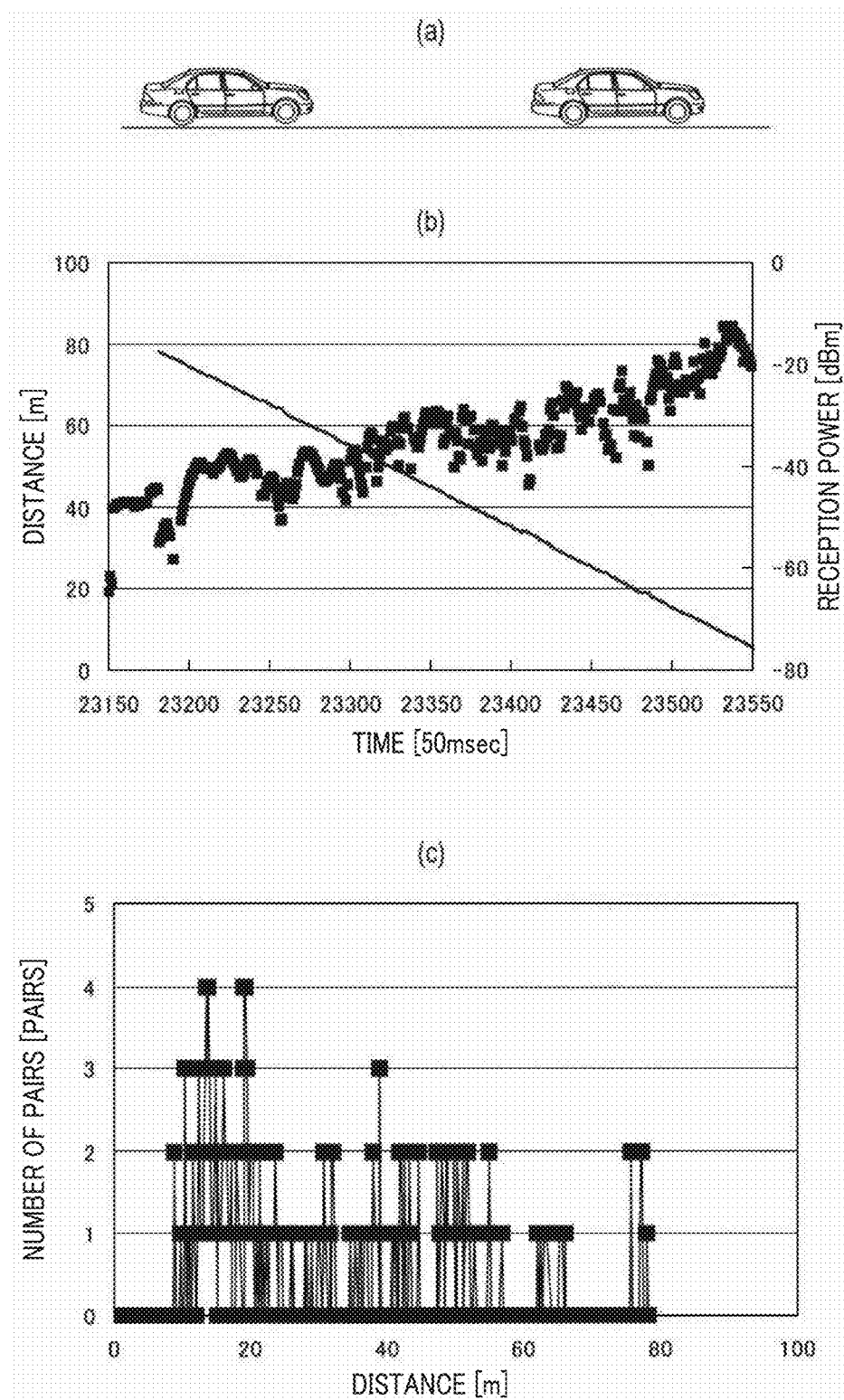
FIG. 7(a) is an explanatory diagram of a road shape and a positional relationship between an own vehicle and a target (another vehicle) having depth (when the own vehicle and the target having depth are present on a flat road)
FIG. 7(b) is a graph that indicates, in time series, the distance to the target having depth and the reception strength of reflected waves from the target having depth detected when the vehicle is approaching the target having depth in the state in FIG. 7(a)
FIG. 7(c) is a graph indicating the changes in depth determination value in relation to distance.
Figure 8:
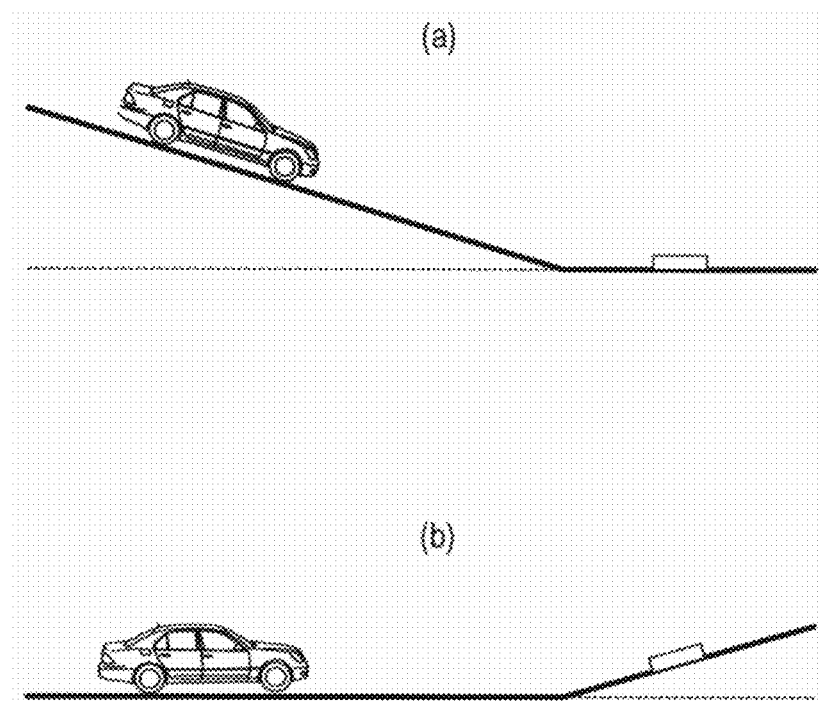
FIG. 8(a) and FIG. 8(b) are explanatory diagrams of road shapes and positional relationships between an own vehicle and a low-lying target.

When the target is a low-lying target (such as a road surface object surmountable by the own vehicle), the reception strength of reflected waves from the target gradually increases as the own vehicle approaches the target, as shown in FIG. 5(*b*). However, when the target is a non-low-lying target (an object having height with which the own vehicle may collide), a null point at which the reception power significantly decreases due to the effect of multipath periodically appears, as shown in FIG. 7(*b*). In other words, when the own vehicle is merely traveling on a flat road, the height of the target can be determined from the null point pattern (S260).

Figure 6:
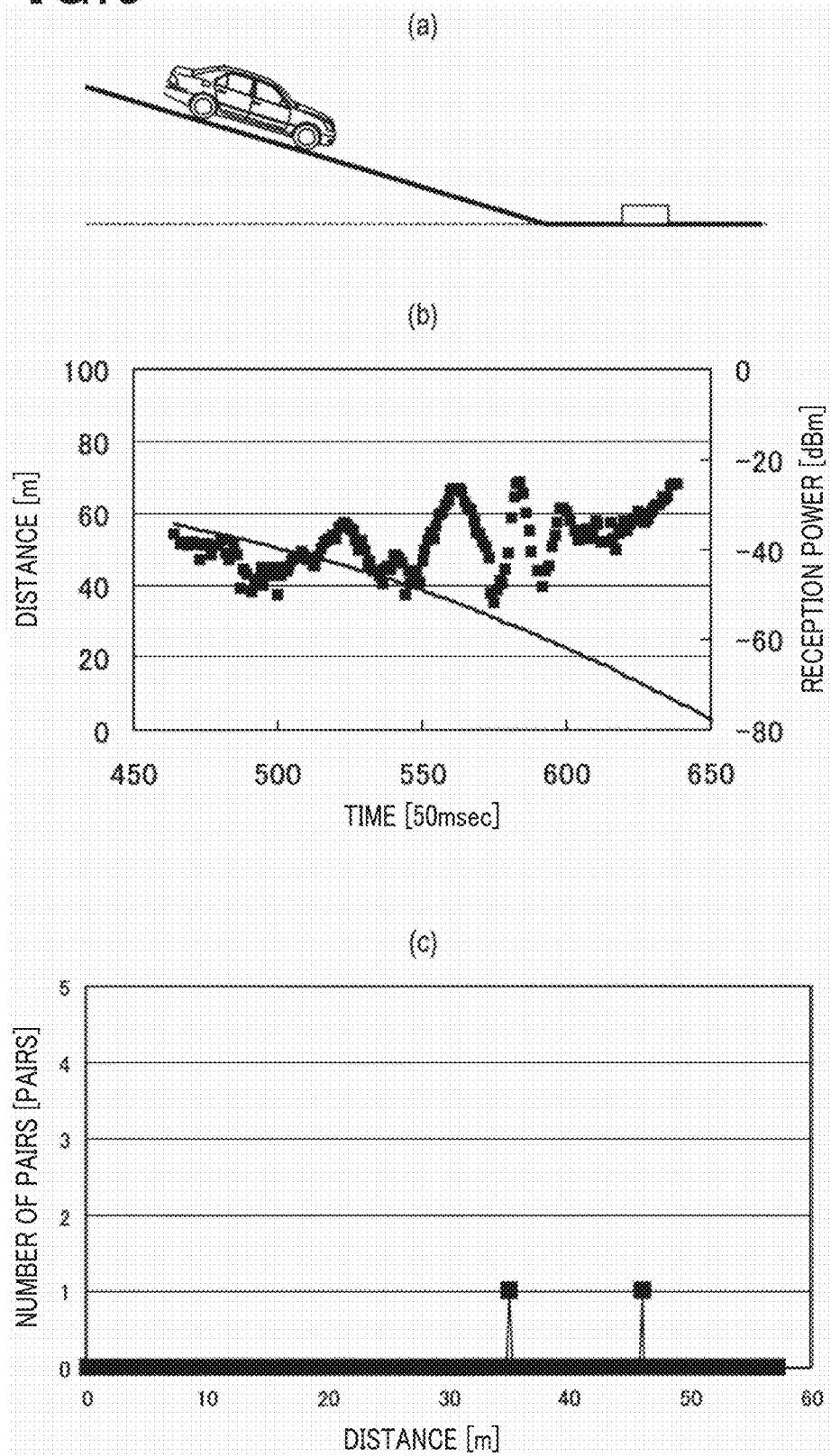
FIG. 6(a) is an explanatory diagram of a road shape and a positional relationship between an own vehicle and a low-lying target (when the vehicle is positioned in the middle of a downhill and the low-lying target is present on a flat road ahead of the vehicle)
FIG. 6(b) is a graph that indicates, in time series, the distance to the low-lying target and the reception strength of reflected waves from the low-lying target detected when the vehicle is approaching the low-lying target in the state in FIG. 6(a)
FIG. 6(c) is a graph that indicates the changes in the depth determination value in relation to distance.

However, even when the target is a low-lying target, depending on the road shape and the positional relationship between the own vehicle and the low-lying target, the null points periodically appear in the reception power in a manner similar to that of non-low-lying targets, as shown in FIG. 6(*b*). Whether or not the target is a low-lying target cannot be determined from the null point pattern.

However, as shown in FIGS. 6(*c*) and 7(*c*), a comparison of depth determination values indicates that the depth determination value is 1 or 2 at the most for a low-lying target having a shallow depth, whereas the depth determination value is 3 or greater for non-low-lying targets, such as a vehicle having a deep depth. Therefore, whether or not a target is a low-lying target can be determined based on the depth determination value.

[Effect]

As described above, according to the present embodiment, the number of stationary pairs meeting the same-object selection condition with reference to a representative pair is used as the depth determination value. When the depth determination value is the low-lying threshold or less, the target is determined to be a low-lying target. When the depth determination value is greater than the low-lying threshold, the target is determined to be a non-low-lying target.

The depth determination value is a value based on the depth of the target, regardless of road shape. Therefore, differentiation between a low-lying target and a non-low-lying target can be made even when differentiation cannot be made using reception power (null point generation pattern).

In addition, according to the present embodiment, a pair that has a historical connection that is confirmed over a plurality of cycles is selected as the representative pair. Therefore, a situation can be suppressed in which height determination is needlessly performed on temporarily appearing pairs that are based on noise.

Second Embodiment

A second embodiment is similar to the first embodiment, other than a difference in a part of the details of the height process. Therefore, descriptions of common configurations are omitted. The difference will mainly be described.

Figure 9:
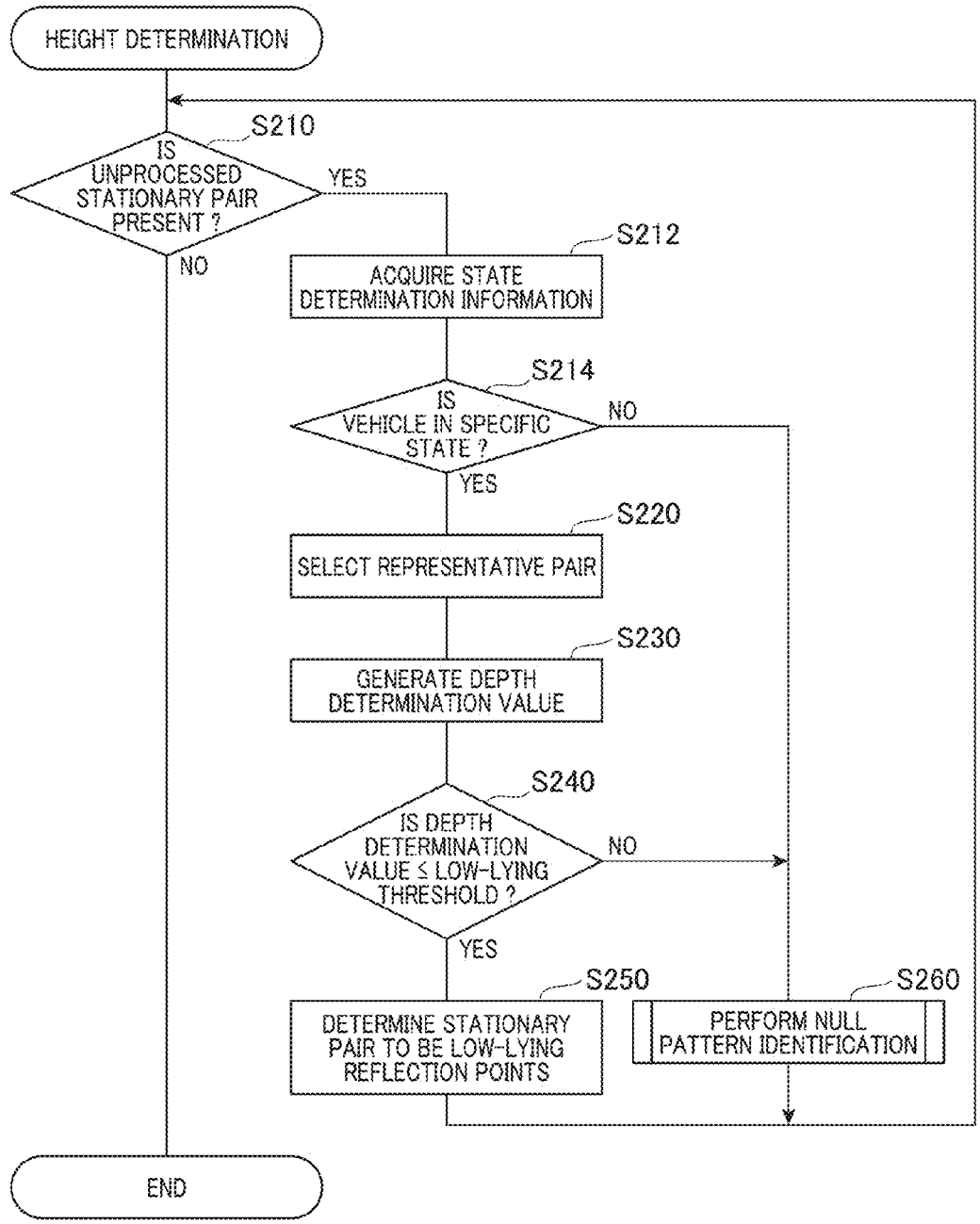
FIG. 9 is a flowchart of the details of a height determination process according to a second embodiment.

As shown in FIG. 9, compared with the height determination process according to the first embodiment (see FIG. 3), the height determination process according to the present embodiment is similar thereto, other than the addition of S212 and S214.

In other words, according to the present embodiment, when determined that an unprocessed stationary pair is present (YES at S210), at S212, the signal processing unit 26 obtains state determination information that is required to determine whether or not the own vehicle is in a specific state in which a low-lying target may be erroneously detected as a non-low-lying target.

Figure 10:
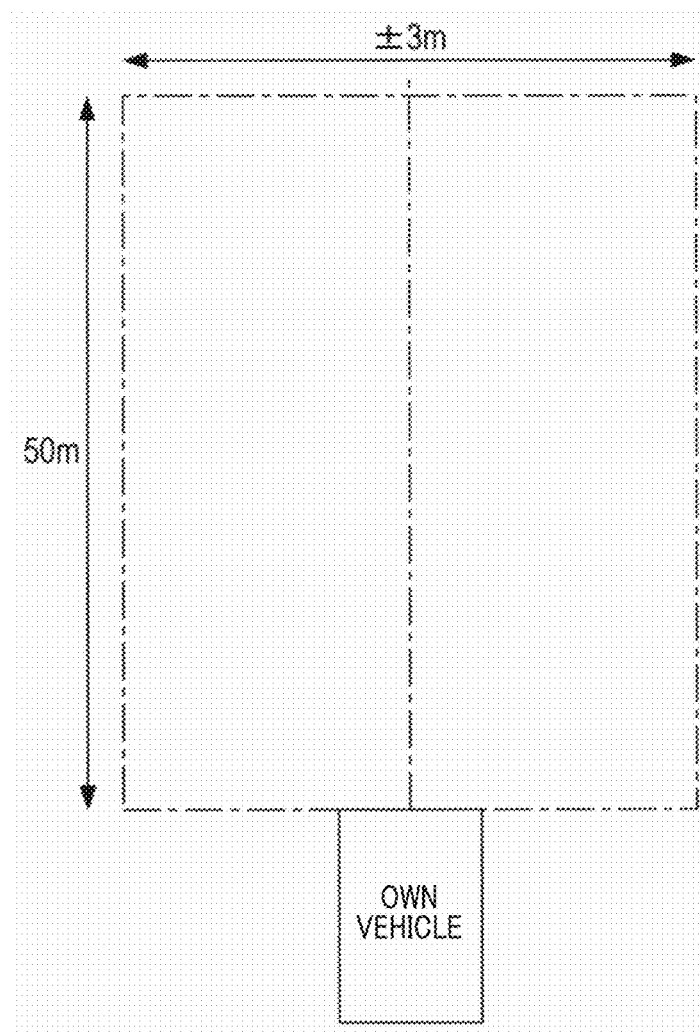
FIG. 10 is an explanatory diagram of a scanning range for peripheral reflective objects.

The state determination information includes at least a designated-area reflection point quantity, a vehicle-body tilt angle, and a fixed-speed continuation period. The designated-area reflection point quantity refers to the number of pairs that are present within a designated area set in advance, among the pairs (reflection points) registered at the earlier S140. As shown in FIG. 10, the designated area is, for example, an area within 50 m ahead of the own vehicle and within ±3 m to the sides, with the own vehicle at the center. For the vehicle-body tilt angle, the detection results from various sensors used to detect the posture of the own vehicle are obtained via the LAN communication bus and the inter-vehicle control ECU 30. The vehicle-body tilt angle is based on the pitch angle of the vehicle body determined based on the obtained information. The fixed-speed continuation period refers to the length of a period over which the vehicle speed can be considered to be a fixed speed (such as when the speed fluctuation is within 5% of the current vehicle speed). The fixed-speed continuation period is determined by obtaining the detection results from a sensor that detects vehicle speed and continuously monitoring the vehicle speed.

At subsequent S213, the signal processing unit 26 determines whether or not the own vehicle is in the specific state, based on the state determination information obtained at S212. Specifically, the signal processing unit 26 determines that the own vehicle is the specific state when any one of the following is established: the designated-area reflection point quantity is equal to or greater than a threshold set in advance; the absolute value of the vehicle-body tilt angle (a forward tilt angle or a backward tilt angle) is equal to or greater than an allowable angle set in advance, or the fixed-speed continuation period does not reach a lower limit time set in advance.

The condition regarding the designated-area reflection point quantity determines whether or not the own vehicle is in a state in which a ceiling or roadside objects in large numbers are present in the periphery of the own vehicle. A state such as this premises a non-valet, multi-story parking lot, an underground parking lot, or the like. Because many sloped passages are found among the driving passages in such parking lots, the own vehicle is considered to be in the specific state. In addition, the condition regarding the vehicle-body tilt angle determines whether or not the own vehicle is actually traveling on a slope by direct detection of the tilt state of the vehicle body, based on a sensor mounted in the vehicle. The condition regarding the fixed-speed continuation period is based on the difficulty of maintaining a fixed speed while traveling on a slope. When the fixed-speed continuation period is a lower limit value or greater, the likelihood that the own vehicle is traveling on a slope is low. Therefore, a determination is made that the own vehicle is not in the specific state. When the opposite determination is made, the own vehicle is determined to be the specific state.

Then, when determined that the own vehicle is in the specific state based on the state determination information (YES at S214), the signal processing unit 26 proceeds to S220. Hereafter, the signal processing unit 26 performs determination similar to that according to the first embodiment using the depth determination value. Meanwhile, when determined that the own vehicle is not in the specific state based on the state determination information (NO at S214), the signal processing unit 26 proceeds to S260 and performs the null pattern identification process.

<Effects>

According to the present embodiment described in detail above, in addition to the above-described effects according to the first embodiment, the following effect can be achieved.

That is, according to the present embodiment, determination using the depth determination value is performed only when the own vehicle is determined to be in the specific state in which a low-lying target cannot be detected by the null pattern identification process. Therefore, efficient processing can be actualized.

OTHER EMBODIMENTS

The embodiments of the present invention are described above. However, the present invention is not limited to the above-described embodiments. It goes without saying that various embodiments are possible.

(1) According to the above-described embodiments, after differentiation between a low-lying target and a non-low-lying target is made based on the depth determination value, the null pattern identification process is performed on the non-low-lying target. However, differentiation using the depth determination value may be performed on a target identified as being a non-low-lying target by the null pattern identification process.

(2) According to the above-described embodiments, the stationary pairs are narrowed down to a representative pair using information on historical connection. However, when the stationary pairs are not narrowed down in this way, the height determination process may be performed immediately after pair matching (S140) or the like.

(3) According to the above-described embodiments, the number of stationary pairs (reflection points on a stationary object) that are present within the recognized-as-same area and meet the same-target condition is used as the depth determination value. However, the depth determination value is not limited thereto. The depth determination value is merely required to be a parameter that enables a value reflecting depth to be obtained.

Figure 11:
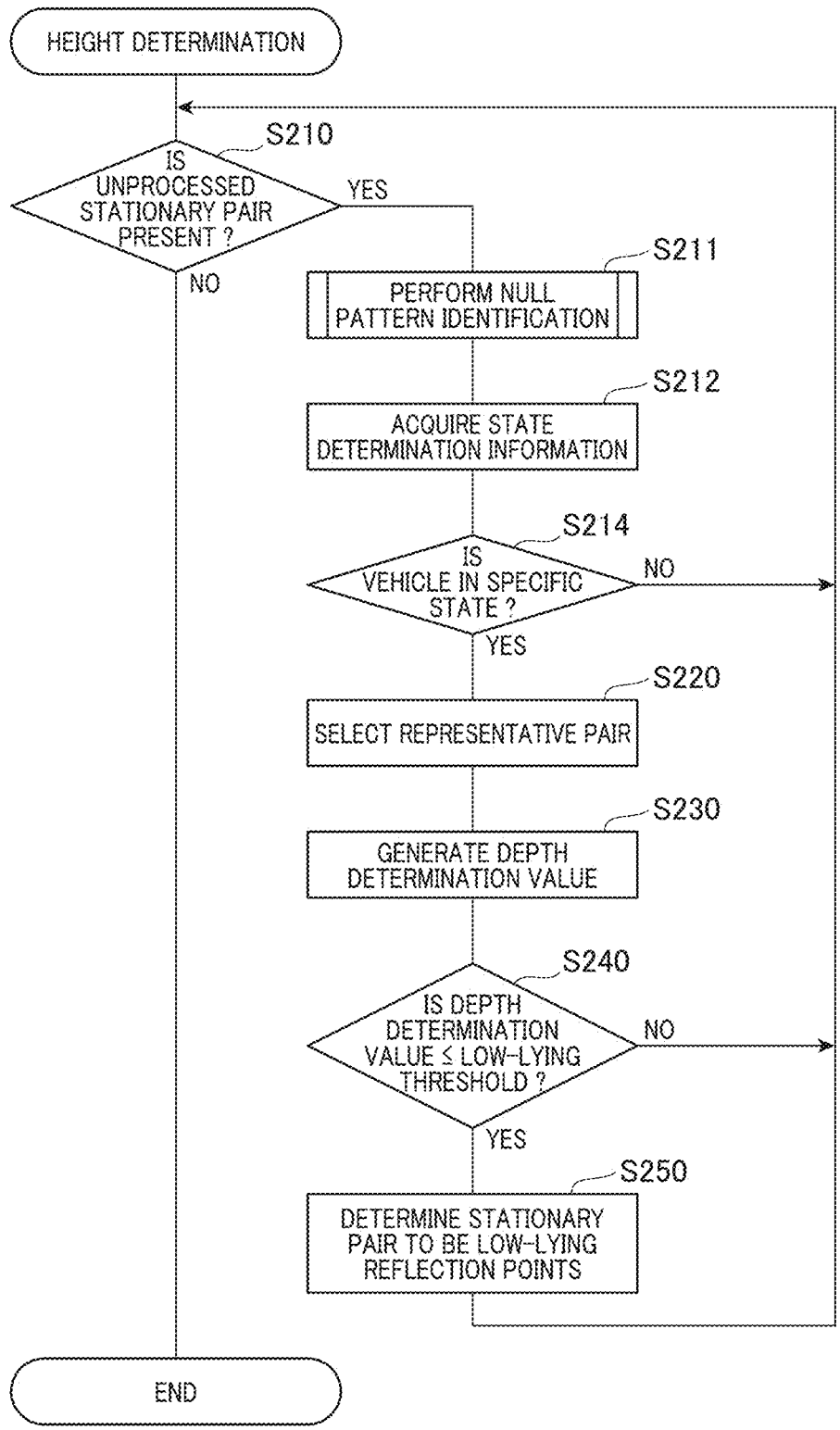
FIG. 11 is a flowchart of the details of a height determination process according to another embodiment.

(4) According to the above-described second embodiment, when the own vehicle is not in the specific state (NO at S214) and the depth determination value is greater than the low-lying threshold (NO at S240), the null pattern identification process (S260) is performed. However, as shown in FIG. 11, a configuration is possible in which the null pattern identification process (S211), of which the details are the same as that at S260, may be performed before the state determination information is obtained (S212), when an unprocessed stationary pair is present (YES at S210). In other words, the null pattern identification process may be performed at all times, regardless of the above-described condition. In addition, in a similar manner, the null pattern identification process may be performed before representative pair selection (S220) in the height determination process according to the first embodiment (see FIG. 3).

(5) Each constituent element in the present invention is conceptual and is not limited to those according to the above-described embodiments. For example, a function provided by a single constituent element may be dispersed among a plurality of constituent elements. Functions provided by a plurality of constituent elements may be integrated in a single constituent element. In addition, at least some of the configurations according to the above-described embodiments may be replaced with publically known configurations that provide similar functions. In addition, at least some of the configurations according to the above-described embodiments may, for example, be added to or substituted for a configuration according to another of the above-described embodiments.

REFERENCE SIGNS LIST

1 radar sensor
10 oscillator
12 amplifier
14 distributor
16 transmission antenna
20 reception antenna unit
21 reception switch
22 amplifier
23 mixer
24 filter
25 A/D converter
26 signal processing unit
30 inter-vehicle control ECU
32 engine ECU
34 brake ECU

The invention claimed is:

1. A target detection apparatus that is mounted in a vehicle and generates information related to a target that is present in the periphery of the vehicle, the target having a height, a width and a depth, the target detection apparatus comprising:

target detecting means for detecting a target that is present in the periphery of the vehicle based on detection results from a radar sensor that transmits and receives radar waves and detects the position and speed of reflection points that have reflected the radar waves, for each measurement cycle set in advance;

determination value calculating means for determining a depth determination value that indicates the depth of the target detected by the target detecting means;

comparing means for comparing the depth determination threshold calculated by the determination value calculating means and a threshold set in advance; and low-lying target determining means for determining that the target is a low-lying target that is surmountable by the vehicle, when the depth determination value is determined to be less than the threshold by the comparing means, wherein the determination value calculating means sets a reflection point that meets a representative condition set in advance, among the reflection points, as a representative reflection point, and determines the number of reflection points that are present within a recognized-as-same area set with reference to the representative reflection point and meet a same-target condition set in advance in relation to the representative reflection point, as the depth determination value.

2. The target detection apparatus according to claim 1, comprising:
tracking means for tracking a subject target that is a target that has been detected over a plurality of measurement cycles by the target detecting means, wherein
the determination value calculating means uses the reflection point associated with the subject target as the representative reflection point.

3. The target detection apparatus according to claim 2, comprising:
state determining means for determining whether or not the vehicle is in a specific state in which the low-lying target may be erroneously determined to be a non-low-lying target, wherein
the low-lying target determining means operates when the vehicle is determined to be in the specific state by the state determining means.

4. The target detection apparatus according to claim 3, wherein:
the state determination means determines that the vehicle is in the specific state when the number of reflection points detected within an area set in advance is greater than a threshold set in advance.

5. The target detection apparatus according to claim 3, wherein:
the state determining means obtains posture information indicating the posture of the vehicle, and determines that the vehicle is in the specific state when the posture information indicates that the vehicle is tilted forward or tilted backward by an angle equal to or greater than an allowable angle set in advance.

6. The target detection apparatus according to claim 3, wherein:
the state determining means obtains speed information indicating the speed of the vehicle, and determines that the vehicle is in the specific state when a continuous traveling period at a fixed speed does not reach a lower limit time set in advance based on the speed information.

7. The target detection apparatus according to claim 1, comprising:
state determining means for determining whether or not the vehicle is in a specific state in which the low-lying target may be erroneously determined to be a non-low-lying target, wherein
the low-lying target determining means operates when the vehicle is determined to be in the specific state by the state determining means.

8. The target detection apparatus according to claim 7, wherein:
the state determining means obtains posture information indicating the posture of the vehicle, and determines that the vehicle is in the specific state when the posture information indicates that the vehicle is tilted forward or tilted backward by an angle equal to or greater than an allowable angle set in advance.

9. The target detection apparatus according to claim 8, wherein:
the state determining means obtains speed information indicating the speed of the vehicle, and determines that the vehicle is in the specific state when a continuous traveling period at a fixed speed does not reach a lower limit time set in advance based on the speed information.

10. The target detection apparatus according to claim 7, wherein:
the state determination means determines that the vehicle is in the specific state when the number of reflection points detected within an area set in advance is greater than a threshold set in advance.

11. The target detection apparatus according to claim 10, wherein:
the state determining means obtains posture information indicating the posture of the vehicle, and determines that the vehicle is in the specific state when the posture information indicates that the vehicle is tilted forward or tilted backward by an angle equal to or greater than an allowable angle set in advance.

12. The target detection apparatus according to claim 11, wherein:
the state determining means obtains speed information indicating the speed of the vehicle, and determines that the vehicle is in the specific state when a continuous traveling period at a fixed speed does not reach a lower limit time set in advance based on the speed information.

13. The target detection apparatus according to claim 1, comprising:
state determining means for determining whether or not the vehicle is in a specific state in which the low-lying target may be erroneously determined to be a non-low-lying target, wherein
the low-lying target determining means operates when the vehicle is determined to be in the specific state by the state determining means.

14. The target detection apparatus according to claim 13, wherein:
the state determination means determines that the vehicle is in the specific state when the number of reflection points detected within an area set in advance is greater than a threshold set in advance.

15. The target detection apparatus according to claim 13, wherein:
the state determining means obtains posture information indicating the posture of the vehicle, and determines that the vehicle is in the specific state when the posture information indicates that the vehicle is tilted forward or tilted backward by an angle equal to or greater than an allowable angle set in advance.

16. A target detection apparatus that is mounted in a vehicle and generates information related to a target that is present in the periphery of the vehicle, the target having a height, a width and a depth, the target detection apparatus comprising:
a radar sensor that transmits and receives radar waves and detects the position and speed of reflection points that have reflected the radar waves, for each measurement cycle set in advance; and
a processing unit
detecting a target that is present in the periphery of the vehicle based on detection results from the radar sensor;
first determining a depth determination value that indicates the depth of the target detected by the target detection;
comparing the depth determination threshold calculated by the determination value calculation and a threshold set in advance;

second determining that the target is a low-lying target that is surmountable by the vehicle, when the depth determination value is determined to be less than the threshold by the comparison; and setting a reflection point that meets a representative condition set in advance, among the reflection points, as a representative reflection point, and determining the number of reflection points that are present within a recognized-as-same area set with reference to the representative reflection point and meet a same-target condition set in advance in relation to the representative reflection point, as the depth determination value.

17. A target detection method that is applied to a vehicle and by which information related to a target present in the periphery of the vehicle is generated, the target having a height, a width and a depth, the target detection method comprising:

detecting a target that is present in the periphery of the vehicle based on detection results from a radar sensor that transmits and receives radar waves and detects the position and speed of reflection points that have reflected the radar waves, for each measurement cycle set in advance;

determining a depth determination value that indicates the depth of the detected target;

comparing the calculated depth determination threshold and a threshold set in advance;

determining that the target is a low-lying target that is surmountable by the vehicle, when the depth determination value is determined to be less than the threshold by the comparison; and setting a reflection point that meets a representative condition set in advance, among the reflection points, as a representative reflection point, and determining the number of reflection points that are present within a recognized-as-same area set with reference to the representative reflection point and meet a same-target condition set in advance in relation to the representative reflection point, as the depth determination value.

\* \* \* \* \*